May 24, 1955     A. W. STEENBERGH     2,708,849

SNAP-ACTION MECHANISM FOR VALVES

Filed Nov. 8, 1949     3 Sheets-Sheet 1

INVENTOR:
ALEXANDER W. STEENBERGH

May 24, 1955   A. W. STEENBERGH   2,708,849
SNAP-ACTION MECHANISM FOR VALVES
Filed Nov. 8, 1949                                 3 Sheets-Sheet 3

INVENTOR:
ALEXANDER W. STEENBERGH

United States Patent Office 2,708,849
Patented May 24, 1955

2,708,849

SNAP-ACTION MECHANISM FOR VALVES

Alexander W. Steenbergh, Voorburg, Netherlands, assignor to G. Dikkers & Co. N. V., Hengelo, Netherlands, a company of the Netherlands Application November 8, 1949, Serial No. 126,059

Claims priority, application Netherlands November 11, 1948

5 Claims. (Cl. 74—100)

This invention relates to a float controlled valve and more particularly to an over-center snap action valve operating an energy storing spring device which is tensioned by the float and is adapted to actuate the valve when released by the float for expanding.

The invention has for its object to provide means conducive to an improved float controlled valve of the kind in which all energy stored in the spring device is available for closing and opening the valve, respectively. To this end according to the invention the pivot shaft of the float-lever carries two arms operating on opposite sides of a lever actuating the valve, said lever being engaged by the energy storing spring device in such a manner that upon rotation of the pivot shaft of the float-lever one of said arms acts on said valve actuating lever and tensions the spring device and thereupon releases said spring device for expanding and rotating said lever without the latter abutting the other arm.

As with this arrangement the tension of the spring or springs only depends on the stroke of the float and the spring is released for expanding when the float reaches a determined position, the liquid levels at which the valve opens and closes, respectively, will not be influenced by the pressure to which the liquid is subjected so that the valve device is particularly adapted for periodically discharging liquid from a tank subjected to a variable gas pressure. During each period of discharge an equal quantity of liquid will be discharged from the tank so that the delivered quantity of liquid may be measured by counting the number of strokes of the float.

Since by the expansion of the spring device the valve is suddenly opened and closed the passage area of the valve is not throttled as is the case with a valve directly coupled to the float. The valve device according to the invention is, therefore, adapted for controlling the discharge of liquids containing solid particles, e. g. the discharge of oil from a separator, to which a mixture of crude oil and gas from an oil-well is supplied and in which the gas is separated from the oil. As the oil often contains sand or dust a scouring action would be exerted on the sealing surfaces of the valve and its seat when the passage area of the valve is throttled and the oil obtains a corresponding increased velocity and in consequence thereof a heavy wear of the valve and its seat would occur.

The invention will be further described with reference to the accompanying drawings showing an embodiment of a float controlled valve mechanism.

Figure 1:
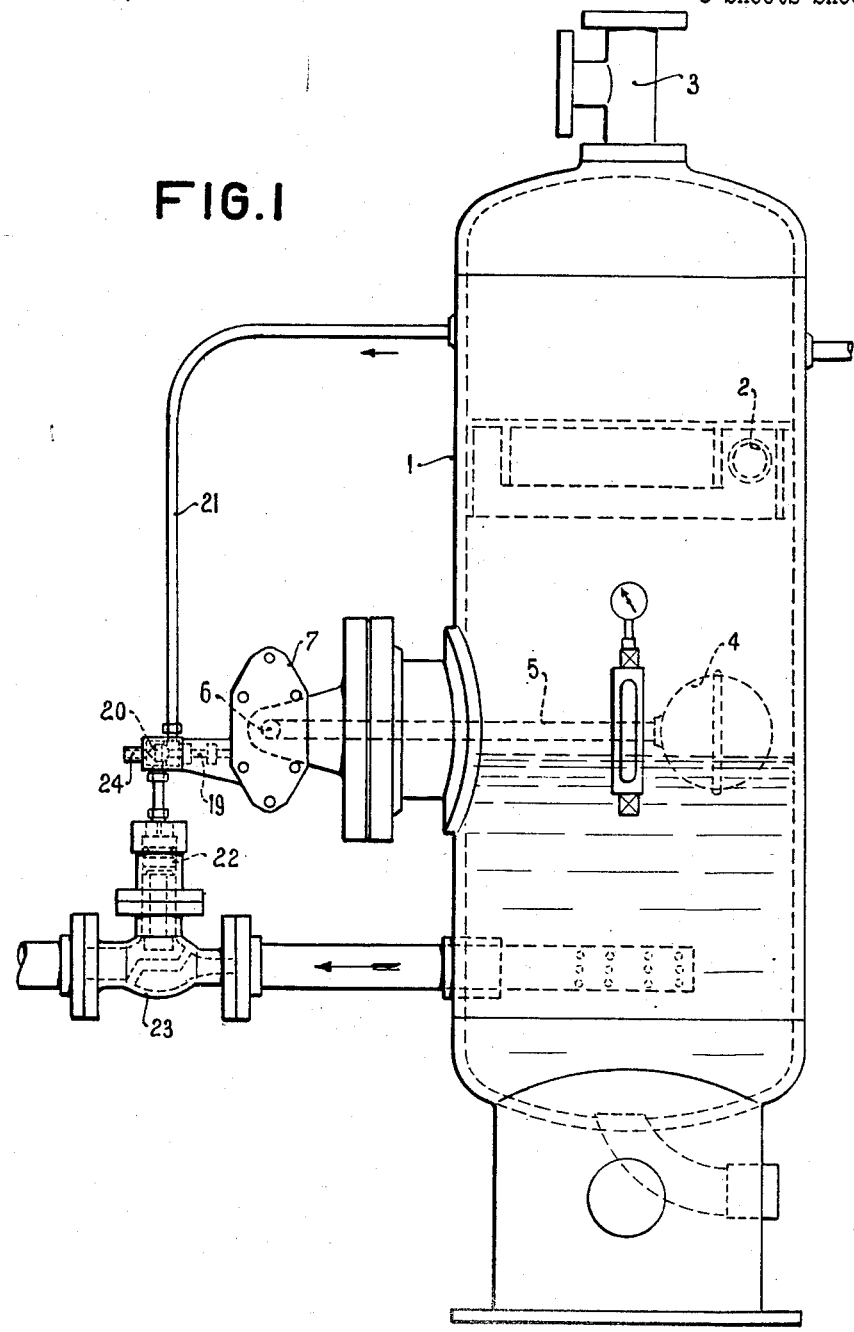
Fig. 1 is an elevational view of a separator for separating gas from crude oil and provided with a valve mechanism according to the invention.

The separator illustrated in Fig. 1 consists of a tank 1 to which the mixture of oil and gas is supplied at 2.

The gas leaves the tank through the outlet branch 3. On the oil level in the tank 1 a float 4 is supported which is connected to a lever 5 secured to a rock shaft 6 so as to have the shaft rotated when the float descends and rises.

To the shaft 6 in the casing 7 a fork-shaped element is secured, the arms or legs 8 and 8a of which each carry an adjustable abutment 9 and 9a, respectively, consisting of a screw. The abutments 9 and 9a cooperate with a roller 10 carried by the arm 11 of a double-armed lever rotatably journalled on shaft 6 and the other arm 12 of which carries a roller 13.

Each lever arm 11, 12 pivotally engages the inner sleeve 14 of a spring box the outer sleeve 15 of which is pivotally secured in the casing by means of a bolt 16. Each pair of sleeves 14, 15 contains a spring 17 having both its ends supported on a washer 18.

The lever arm 12 extends through a slot 26 of a guiding body 27 connected to the pusher rod 19 of a pilot valve 20 adapted to connect the conduit 21 opening into the tank 1 to the space above the piston 22 of the valve body of the discharge valve 23 so as to close said latter valve and preventing the oil from flowing out of the tank.

With the position of the pilot valve 20 shown in Fig. 1 the space above the piston 22 of the discharge valve 23 at 24 communicates with the atmosphere so that the pressure above the piston is relieved and the pressure exerted on the liquid in the tank 1 may force the valve 23 to open position whereby the oil is discharged from the tank (see arrow). Said position of the pilot valve 20 is obtained by the action of the float 4 during its ascending movement, whereby roller 13 strikes the adjusting screw 25 and urges pusher rod 19 to its right hand position. As the oil flows from the tank the float 4, however, descends and thereby rotates the shaft 6 carrying the arms 8 and 8a so that the abutment 9 strikes against the roller 10 and the lever 11, 12 is now returned to its vertical position in clockwise direction and the springs 17 are compressed.

Figure 2:
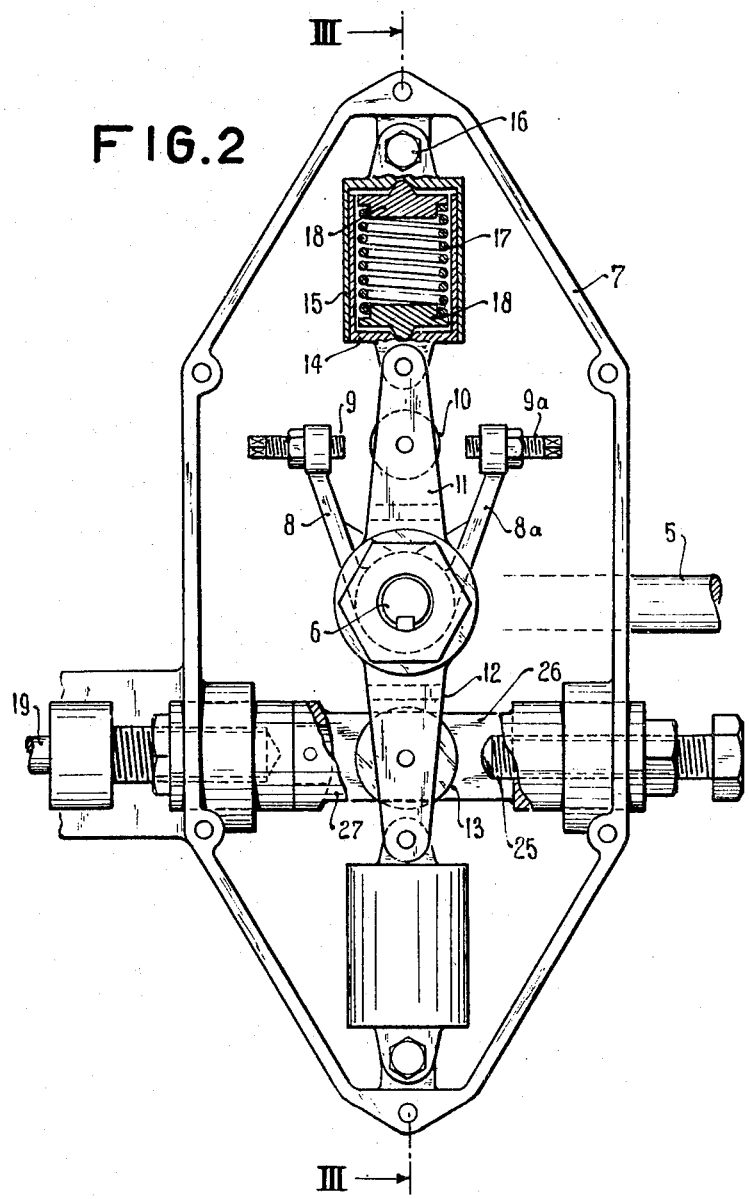
Fig. 2 is a view of a casing containing the float actuated valve mechanism with the energy storing spring device, the cover being removed.
Figure 3:
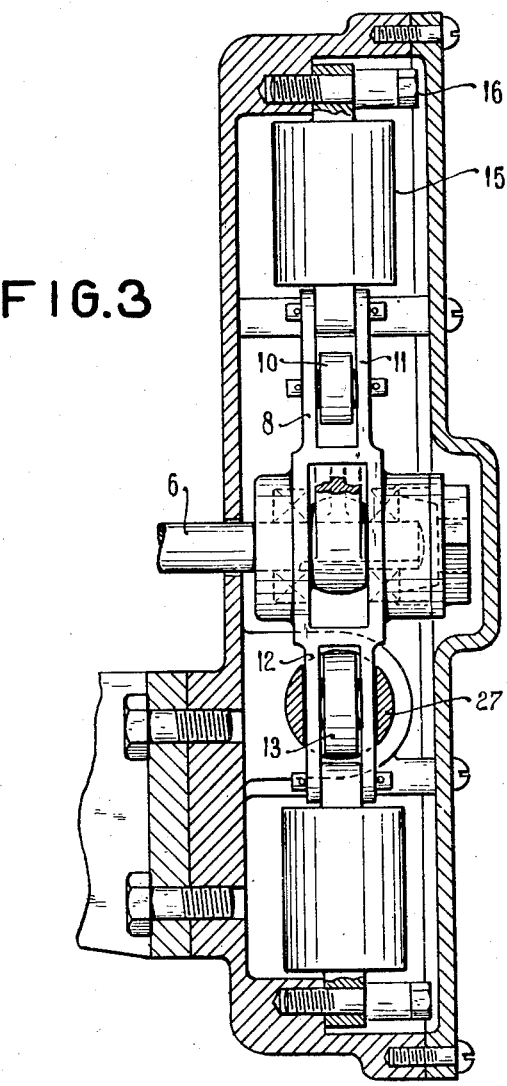
Fig. 3 is a vertical sectional view of the casing, taken on line III—III of Fig. 2.

The quantity of energy stored in the springs during said compression depends on the stroke and the floating power of the float. In Fig. 2, the springs 17 are shown in their compressed position as the lever 11, 12 is now in dead center position. This position of lever 11, 12 and the springs is a position of instability. As soon as the lever 11, 12 passes said dead center position the springs 17 are free to expand so that the lever with roller 13 snaps to the left in Fig. 2 whereby the guiding body 27 together with pusher rod 19 is forced to the left without, however, having the abutment 9a striking against the roller 10. The pilot valve 20 connected to rod 19 (Fig. 1) now connects the space above the piston 22 to conduit 21 so as to have the gas pressure in tank 1 acting on the piston 22, whereby valve 23 closes. The oil level in tank 1 now starts through the admitted oil supply to rise whereby the shaft 6 is rotated by the float and the springs 17 are now compressed by the abutment 9a at the end of arm 8a so that the lever 11, 12 again reaches the illustrated dead center position and thereupon snaps beyond said position when the float further rises, whereby the roller 13 now strikes against the adjusting screw 25 threaded into the guiding body 27.

By the sliding movement of the guiding body 27 to the right in Fig. 2 the pilot valve 20 reaches the position illustrated in Fig. 1 whereby the space above the piston 22 is connected to the atmosphere through pipe 24 and the valve body of the discharge valve 23 is forced open by the pressure of the oil below the valve body so that the oil again can flow off from the tank and the cycle described above is repeated.

Since the valve 23 is suddenly fully opened or closed by the snap action of the springs 17 intermediate positions of said valve with a throttled passage area cannot occur so that wear of the sealing surfaces of the cooperating seat and valve body are reduced to the least possible degree, the more so as the valve is only opened during a short time in relation to the period of closing.

As the positions of the levels of the oil in the tank 1 at which the float urges the lever 11, 12 through its vertical position are independent of the gas pressure in the tank a substantially equal quantity of oil will be discharged during each period so that the mechanism needs only to be provided with a counter for measuring the quantity of oil discharged.

As stated above the time during which the valve 23 is open is only a fraction of that of the period of closing so that differences in the supply of oil to the tank during the period of opening of the valve give rise to a slight inaccuracy only.

Having thus described the invention, what is claimed as new and desired to be secured by Letters Patent, is:

1. A snap actuating device for a float controlled valve comprising a float carrying lever, a rock shaft to which said float carrying lever is attached, an abutment arm extending at either side of and from said shaft, a double-armed lever having outer ends and movably suported on said shaft, said double-armed lever being provided with a roller positioned intermediate said arms, an energy storing spring device including two opposed springs each connected to a respective outer end of said double-armed lever, and means actuatable by said double-armed lever and including a slotted pusher rod through which said double-armed lever extends, said pusher rod extending in a direction transverse to said double-armed lever, whereby upon movement of said float carrying lever said rock shaft will be rotated in a predetermined direction thereof and will cause the respective abutment arm to force said double-armed lever to move in said slotted pusher rod and release said springs for rotating said double-armed lever to actuate said pusher rod.

2. A snap acting float controlled valve mechanism comprising an actuating lever, a rock shaft to which said lever is attached, a double-armed lever having outer ends and movably supported on said shaft, an abutment arm rigidly secured to said shaft and extending at either side of said shaft and therebeyond, whereby said double-armed lever is positioned intermediate said abutment arms, an energy storing spring device including two opposed springs each connected to a respective outer end of said double-armed lever, and a pusher rod actuatable by said double-armed lever, whereby movement of said actuating lever causes rotation of said rock shaft in a predetermined direction thereof and engagement of the respective abutment arm with said double-armed lever against action of said springs.

3. A snap acting float controlled valve mechanism according to claim 2, wherein said double-armed lever is provided with rollers for respective engagement with said abutment arms and said pusher rod.

4. A snap acting float controlled valve mechanism according to claim 2, wherein said abutment arms are provided with adjustable abutment elements, and roller means on said double-armed lever and intermediate said abutment elements.

5. A snap acting float controlled valve mechanism according to claim 2, wherein said pusher rod is provided with a slot through which said double-armed lever movably extends, and means extending into said slot and adjustable with respect to said double-armed lever to control the movement of latter relative to said slot.

References Cited in the file of this patent

UNITED STATES PATENTS

| | | |
|---|---|---|
| 217,834 | Thomas | July 22, 1879 |
| 365,585 | Davis | June 28, 1887 |
| 1,768,625 | Olsen | July 1, 1930 |
| 1,893,066 | Zellhoefer | Jan. 3, 1933 |
| 1,895,650 | Carmean | Jan. 31, 1933 |
| 2,164,037 | Lockett | June 27, 1939 |
| 2,264,070 | Davis | Nov. 25, 1941 |
| 2,314,714 | Kouyoumjian | Mar. 23, 1943 |
| 2,404,315 | Rotter | July 16, 1946 |
| 2,468,551 | Goff | Apr. 26, 1949 |

FOREIGN PATENTS

| | | |
|---|---|---|
| 516,037 | Great Britain | Dec. 20, 1939 |